US012739135B2

(12) United States Patent
Friesen et al.

(10) Patent No.: US 12,739,135 B2
(45) Date of Patent: Sep. 15, 2026

(54) METHOD FOR AUTHENTICATING DATA

(71) Applicant: MERCEDES-BENZ GROUP AG, Stuttgart (DE)

(72) Inventors: Viktor Friesen, Karlsruhe (DE); Albert Held, Neu-Ulm (DE); Viktor Pavlovic, Nufringen (DE); Philipp Weber, Tauberbischofsheim (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 44 days.

(21) Appl. No.: 19/107,197

(22) PCT Filed: Jul. 31, 2023

(86) PCT No.: PCT/EP2023/071198
§ 371 (c)(1),
(2) Date: Feb. 27, 2025

(87) PCT Pub. No.: WO2024/046681
PCT Pub. Date: Mar. 7, 2024

(65) Prior Publication Data

US 2026/0074918 A1 Mar. 12, 2026

(30) Foreign Application Priority Data

Aug. 30, 2022 (DE) ..................... 10 2022 003 160.4

(51) Int. Cl.
*H04L 9/32* (2006.01)
*H04L 9/08* (2006.01)

(52) U.S. Cl.
CPC .......... *H04L 9/3268* (2013.01); *H04L 9/0825* (2013.01)

(58) Field of Classification Search
CPC ..... H04L 9/3268; H04L 9/0825; H04L 63/12; G06F 21/64
See application file for complete search history.

(56) References Cited

U.S. PATENT DOCUMENTS 10,313,397 B2 * 6/2019 Komu ..................... H04L 63/20
10,735,206 B2 * 8/2020 Shin ...................... H04L 9/0643
(Continued)

FOREIGN PATENT DOCUMENTS

DE 102011079109 A1 1/2013
DE 102011079109 B4 3/2013
(Continued)

OTHER PUBLICATIONS

International Search Report and Written Opinion mailed Nov. 3, 2023 in related/corresponding International Application No. PCT/EP2023/071198.
(Continued)

*Primary Examiner* — Amie C. Lin
(74) *Attorney, Agent, or Firm* — PATENT PORTFOLIO BUILDERS PLLC

(57) ABSTRACT

Data transmitted in a system having at least three instances is authenticated between two of these instances. Some of the instances implement an authentication mechanism so that a first instance can authenticate itself to a neighboring instance trusting the first instance. The data to be transmitted by the first instance as a source instance to a non-neighboring target instance is authenticated by the source instance and passed to an intermediate instance that trusts the source instance. The intermediate instance checks the authentication and provides the data with the identity label of the source instance, reauthenticates the data, and passes it to a neighboring instance trusting the intermediate instance. The neighboring instance checks the authentication, reauthenticates the data provided with the identity label of the source instance and passes it to a neighboring instance that trusts it, this process being repeated until the data to be transmitted reaches the target instance.

11 Claims, 3 Drawing Sheets

(56) References Cited

U.S. PATENT DOCUMENTS

| | | | | |
|---|---|---|---|---|
| 10,834,206 | B2 * | 11/2020 | Acharya ................ | H04W 4/44 |
| 2018/0212781 | A1 | 7/2018 | Keser et al. | |
| 2020/0202017 | A1 | 6/2020 | Parry et al. | |
| 2021/0067495 | A1 | 3/2021 | Yuting et al. | |

FOREIGN PATENT DOCUMENTS

| | | | |
|---|---|---|---|
| DE | 102017205993 | A1 | 10/2018 |
| DE | 102021001170 | A1 | 3/2022 |

OTHER PUBLICATIONS

Office Action created Jun. 19, 2023 in related/corresponding DE Application No. 10 2022 003 160.4.

Office Action dated Feb. 20, 2025 in related/corresponding EP Application No. 23 751 880.8.

Schneier; "Angewandte Kryptographie;" 1996; pp. 38-40; Addison-Wesley Publishing Company.

* cited by examiner

METHOD FOR AUTHENTICATING DATA

BACKGROUND AND SUMMARY OF THE INVENTION

Exemplary embodiments of the invention relate to a method for authenticating data which is transmitted in a system having at least three instances between two of these instances, wherein each of the instances has a unique identity label.

Today, modern vehicles are typically part of a so-called vehicle ecosystem. A central part of this system is the so-called vehicle backend or backend for short, a vehicle-external server, which is usually operated as a proprietary server and is often implemented in a commercial cloud. The vehicles are connected to this backend via the internet. The communication between the backend and the vehicles is secured with the aid of known standard methods, mostly TLS, sometimes also IPSec. Sub-systems or instances of this vehicle ecosystem are individual control devices (ECUs) installed in the vehicles, which communicate with each other mostly via vehicle-internal buses, for example CAN, FlexRay, or Ethernet. Further instances of the vehicle ecosystem also form smart terminals or applications running thereon, mostly proprietary applications of the OEM, which are operated, for example, on smartphones and which communicate with individual control devices inside the vehicle and/or with the backend. Their communication with control devices mostly takes place inside the vehicle via NFC, WLAN, or Bluetooth, their communication with the backend typically takes place via mobile radio, for example UMTS, LTE, or 5G. Other sub-systems or instances of the vehicle ecosystem can also be manufacturer-specific external devices, such as for example OBD dongles, which usually communicate directly with individual control devices inside the vehicle via a suitable interface.

The securing of the diverse communication relationships inside such a vehicle ecosystem is therefore typically similarly diverse as the communication relationships themselves. Many of these communication relationships are secured with standardized protocols such as, for example, TLS or IPSec. Bluetooth or WLAN connections have their own further protection mechanisms, which are often expanded by additional manufacturer-specific protection mechanisms on the application level. The vehicle-internal communication between control devices is mostly secured with SecOC.

In practice, it is the case that the backend typically has multiple modules which communicate with the vehicles in the vehicle ecosystem. Generally, each of the vehicles contains a telematics control unit (TCU), which in turn contains a SIM card and can produce a direct internet connection to the backend or its modules. Certain control devices inside the vehicle communicate with external devices, such as for example smartphones, laptops, dongles via NFC, Bluetooth, WLAN or also via the OBD2 socket which is present for on-board diagnosis in all modern vehicles. In addition, typically several of these external devices, for example smartphones, are similarly connected to the backend via a connection secured with TLS.

In principle, it is known from the prior art and, for example, it is described in US 2020/0202017 A1 to secure the communication between participants of a vehicle ecosystem via encryption. Here, for example, end-to-end security of the communication via suitable encryption methods is conceivable. The disadvantage of this encryption method is, however, that the encryption is typically not authenticated, meaning that the backend or one of its modules cannot be sure, as an addressee, if the received data has actually been encrypted by this control device (ECU) or if, in the case of a download, the request and thus the symmetrical session key used for the securing or the transport key actually originates from this control device.

In order to remedy this weakness, it would be necessary to guarantee that the control device communicating with the backend module with end-to-end encryption is also able to asymmetrically sign its messages. For this to be possible, however, the respective control device would have to be provided with a device-individual private key, the control device would have to be able to store its device-individual private key securely, i.e., for example, in a hardware security module (HSM), and the control device would have to be able to carry out an asymmetrical signing operation, wherein it has to be considered that an asymmetrical signing operation is very computationally intensive, for example in the case of using RSA, in particular is several orders of magnitude more computationally intensive than checking a digital signature. This can therefore scarcely be carried out in a sensible time by resource-poor devices.

In practice it is now, however, the case that many control devices installed in the vehicles are resource-poor devices, which are technically not able to securely store a secret, such as a device-individual private key, in particular because they do not include an HSM. Furthermore, many control devices are not able to provide the required computational power in order to sufficiently quickly and efficiently calculate a digital signature with the aid of their private key.

Exemplary embodiments of the present invention are therefore directed to a method for authenticating data inside a system, which method minimizes these disadvantages.

In the method according to the invention, the system, which can be a vehicle ecosystem according to a very advantageous embodiment of the method according to the invention, comprises different sub-systems or instances. For these instances of the system or vehicle ecosystem, different communication mechanisms are used for communication, which in turn are secured with different protection mechanisms. The entire system is very heterogeneous in terms of communication and its protection.

It is also often the case that in such systems, and this applies in particular but not only to a vehicle ecosystem, there is a hierarchical structure in many places. For example, all control devices installed in a vehicle, which represent individual instances of the system, can be regarded as "the vehicle" by the backend or one of its modules, which similarly represent instances of the system. If a dongle or a smartphone is currently connected to the vehicle, for example via Bluetooth, the dongle or the smartphone or the application connected to the vehicle running thereon, can be understood as "the vehicle" from the point of view of the backend at this time.

Inside such a system, various relationships of trust can exist, which similarly are often organized hierarchically and are implemented or supported technically in different ways. For example, a control device installed in the vehicle can classify a second control device, which the first control device recognizes as being installed in the same vehicle, as trustworthy because it assumes that the integrity of the entire system installed in the vehicle cannot be simply trivially bypassed. This is based on the experience that it is not easily possible to bring an additional unknown or non-approved control device into the vehicle. Furthermore, it is the case that, for example, a control device trusts a smartphone, connected to it via Bluetooth, or the application running thereon, because the Bluetooth pairing for this smartphone has been carried out by a person who was in possession of the vehicle key at the time of the pairing and thus clearly was authorized to carry out the pairing. By using the Bluetooth security mechanisms, the control device can therefore be sure that the smartphone connected to it is the same one which has been approved by the authorized person via the Bluetooth pairing. Thus, it can continue to trust the smartphone. On the other hand, for the same reasons, the smartphone can accordingly trust the control device connected to it. Analogously, there can be a relationship of trust between a control device installed in the vehicle, such as for example the telematics control unit, and the backend or a certain module inside the backend. Furthermore, if this control device is in possession of secrets, such as for example a private endorsement key and an associated endorsement certificate, it can securely authenticate itself using these to another system, and here in particular also to the backend or a certain backend module. In this manner, the backend can therefore trust the messages received from this control device and the information contained therein authenticated by this control device. In particular, this control device can be seen by the backend as a trustworthy proxy for the entire vehicle and thus in particular as a trustworthy proxy for all control devices installed therein, due to the above-described external view of the vehicle as a whole by the backend.

If, for the reasons described above, individual control units are not able to authenticate the data they transmit directly to the target instance themselves, the data to be transmitted from these instances can be authenticated via another control unit in the vehicle, such as the telematics control unit, or another instance connected to the vehicle in a relationship of trust. This further instance then forms an intermediate instance as it were, which trusts the source instance transmitting the data. The intermediate instance can therefore receive the data to be transmitted from the source instance, provide the data with the identity label of the source instance, authenticate it and pass it on to a target instance, such as for example a backend module of the vehicle backend. Although the individual control device in the vehicle is not able to authenticate its data, for example because it is lacking the ability to securely store a secret and/or because the required computational capacity is not available, it can use the intermediate instance in order to be able to authenticate its data to the target system. The authentication is therefore delegated by the source instance to the intermediate instance. Simultaneously, in the process, checking the authenticity of the data sent by the source instance is delegated by the target instance to the intermediate instance, which has the result that the target instance has to trust the intermediate instance.

In the method according to the invention, in principle any number of intermediate instances can be provided between a source instance and a target instance. The transmission of the transmitted data takes place together with an identity label of the source instance as a source of the data to be transmitted via the respective intermediate instances, of which at least the receiving intermediate instance trusts the sending intermediate instance, where naturally both sides can also trust each other. Therefore, the first intermediate instance authenticates the data together with the identity label of the source instance, the next intermediate instance checks the authentication of the received data together with the identity label of the source instance, if the check is positive, it re-authenticates the data together with the identity label of the source instance and passes it on to the following neighboring intermediate instance, and so on, until the data passed on from neighboring instance to neighboring instance reaches the target instance. This delegation of authentication means that data from instances not set up for this purpose can also be authenticated accordingly, which increases security. It should be noted that, on the other hand, the authenticity check is delegated from the receiving to the sending neighboring instance.

Neighboring in the sense of the present description means that a first instance is considered to be neighboring to at least one other, e.g., second instance, if the two instances have implemented a common authentication mechanism, with the aid of which the first instance can authenticate itself to the second instance and if, in addition, the second instance trusts the first instance. Being neighboring therefore has nothing to do with physical proximity and, in particular, is not a symmetrical relation.

A particularly favorable embodiment of the method according to the invention now provides for three instances. One of the instances is then the source instance, one is the target instance, and one forms the intermediate instance. The system, for example the vehicle ecosystem, can comprise more sub-systems or instances than just these three. In the method for authenticating the data, however, only these three instances are included. This makes the construction relatively simple and efficient since the data does not have to be checked in each case over a relatively long chain of intermediate instances and re-authenticated.

It is therefore proposed to provide a variant for a part, consisting of three instances with their respective identity labels, of an existing system, which may, in particular, be a vehicle ecosystem or only a part of such an ecosystem, in which variant a relationship of trust exists both between the first instance, as a source instance, and the intermediate instance and between the intermediate instance and the third instance, as a target instance. The source instance and the intermediate instance have implemented a first authentication mechanism, with the aid of which the source instance can authenticate itself to the intermediate instance. The intermediate instance and the target instance have implemented a second authentication mechanism, with the aid of which the intermediate instance can authenticate itself to the target instance. Data to be sent from the source instance to the target instance is then initially authenticated by the source instance with the first authentication mechanism and transmitted to the intermediate instance. The intermediate instance checks the authenticity of the data transmitted from the source instance by means of the first authentication mechanism. If the check has a positive result, the intermediate instance combines the data with the identity label of the source instance and authenticates this data with the second authentication mechanism in order to transmit it to the target instance. The target instance is now able to check the authenticity of the combination consisting of the data and the identity label of the source instance by means of the second authentication mechanism. If the check has a positive result, the target instance can use and/or further process the data accordingly and can then trust that the data authentically originates from the source instance.

In this case, in general it is not necessary to use the same authentication mechanisms. Rather, the first and second authentication mechanisms may be different mechanisms, so that the target instance cannot check the authenticity of the data authenticated by the source instance using the first authentication mechanism, for example because the target instance has not implemented the appropriate mechanism and/or because the target instance lacks the cryptographic material necessary to check the authenticity of the data authenticated by the source instance using the first authentication mechanism and/or because a prerequisite of the first authentication mechanism, for example the local proximity between the participating instances or the communication of the participating instances via a specific bus, is not given for the source instance on the one hand and the target instance on the other. The local proximity can be detected, for example, according to DE 10 2021 001 170 A1.

In this case, the source instance could be a smartphone that authenticates itself to an intermediate instance, for example to a control device installed in the vehicle, by means of Bluetooth mechanisms, while this control device as the intermediate instance has in turn implemented an endorsement authentication mechanism. The intermediate instance would therefore be in possession of a private endorsement key and an associated endorsement certificate, with which the intermediate instance can authenticate itself to the target instance, for example a backend module. The backend module as a target instance cannot check the Bluetooth authentication of the source instance. The target instance can only assume on this basis that the transmitted data actually originates from the source instance if it trusts that the intermediate instance for its part has ensured that the data originates from the source instance, and in addition if the target instance assumes that the second authentication mechanism used between it and the intermediate instance is secure.

A further extraordinarily favorable embodiment of the method according to the invention can also provide that at least one of the instances comprises at least one, typically several sub-instances with a unique identity label. The instance trusts at least this one sub-instance, wherein the at least one sub-instance has implemented an authentication mechanism by means of which it can authenticate itself to the instance to which it is subordinate. Therefore, not only can the method be used with one chain of instances and intermediate instances, but also when branching from one instance into several other sub-instances, all of which are trusted by the instance. These sub-instances can then form source instances or also the data sources for the subordinate instances as a source instance.

A further very advantageous embodiment of the method according to the invention provides that at least one of the following authentication mechanisms is used. For example, authentications based on digital signatures can be used. Additionally or alternatively, authentications based on symmetrical methods can be used, such as the MAC method. The implemented mechanisms of Bluetooth, WLAN, NFC or SecOC and TLS, which are mostly based on digital signatures and/or symmetrical methods, can also form the basis for the authentication. Furthermore, however authentication methods or mechanisms are conceivable which are not based on cryptographic methods and/or secrets, but, for example, on biometric methods that use technology to establish local proximity and/or on the use of a secure and trustworthy communication channel. Combinations are also conceivable.

Here, as the list above shows, the authentication mechanisms do not necessarily have to be based on cryptographic methods and/or secrets, rather they can be other methods, in particular such as biometric methods. For example, one of the instances can be a combination of a mobile data carrier, for example a USB stick or a USB hard drive or similar, and a person with a unique individual identity label, wherein the data to be transmitted is stored on the mobile data carrier. If the person now connects the mobile data carrier to a suitable connection of a head unit installed in the vehicle, which forms the second instance, and a camera is connected to the head unit, which uniquely identifies the person who has connected the data carrier, e.g., by iris recognition, then the head unit can determine in this way which person has connected the mobile data carrier. The head unit, as an intermediate instance, can then transmit the data to another instance, e.g. a backend module, as a target instance in an authenticated manner, e.g., via TLS, specifying the assignment of the data to the person who has connected the mobile data carrier, i.e., their identity label.

Furthermore, the first instance can also directly be a person who enters data via the input unit of a head unit installed in the vehicle, which forms the next instance; a camera is connected to the head unit, which uniquely identifies the person entering the data via iris recognition. In this way, the head unit as the second instance determines which person has entered the data and can transmit this data to the target instance, e.g., a backend module, authenticated with an authentication mechanism, e.g., via TLS, specifying the assignment of the data to the identity label of the person who entered it.

During the transmission, authenticated with the first authentication mechanism, of the data from the source instance to the intermediate instance and the transmission, authenticated with the second authentication mechanism, of the data including the identity label of the source instance from the intermediate instance to the target instance, additional data may have to be transmitted from the source instance to the intermediate instance or from the intermediate instance to the target instance, depending on the type and nature of the two authentication mechanisms, which additional data is required by the receiving instances to check the authentication of the respective received data. For example, this additional data can be so-called authentication stamps, such as for example digital signatures or message authentication codes (MACs).

As already explained above, according to a very advantageous embodiment of the method according to the invention, it can also be provided to use, as an authentication mechanism with respect to the target instance, an authentication with the aid of a private endorsement key of the instance sending the data and its endorsement certificate. This transmission is particularly secure with regard to the authentication and can for example be used by a TCU as an intermediate instance, which forms the central communication channel of a vehicle with the backend or a module of the backend.

The method according to the invention in one of its embodiments does not protect the data sent from the source instance against being read by the intermediate instance which confirms the authenticity of this data to the target instance. Therefore, according to a very advantageous further development of the method according to the invention, it is proposed that encryption of the transmitted data is realized between the source instance and the target instance, as end-to-end encryption as it were.

According to an extraordinarily favorable further development thereof, it can be provided that the target instance is provided with an asymmetrical decryption method and a matching asymmetrical key pair, and that the private key is stored securely in the target instance. The source instance is then provided with a corresponding asymmetrical encryption method and the public key of the target instance. The data to be transmitted from the source instance to the target instance can be encrypted directly before the transmission to the target instance with the public key by means of the encryption method. The at least one intermediate instance cannot then read the data, so that end-to-end encryption is feasible in which the authentication can still be delegated to the intermediate instance trusting the source instance.

According to a corresponding further development thereof, it may also be provided that the source instance is also provided with a symmetrical encryption method and the target instance is provided with the corresponding symmetrical decryption method and that, before it is sent to the intermediate instance, the data to be transmitted from the source instance to the target instance is encrypted with an (in each case) newly created secure, e.g., random, symmetrical key matching the symmetrical encryption and decryption method, a so-called transport key. This newly created transport key encrypts the source instance with the abovementioned asymmetrical public key of the target instance. The source instance then transmits the thus encrypted transport key as a part of the data to be authenticated to the intermediate instance.

This described variant of the method according to the invention therefore provides that the source instance is provided with the public key of the target instance, wherein this public key is stored as a pure key and not as a certificate. Therefore, the introduction of this key has to take place in a secure manner. It therefore has to be guaranteed that the source instance knows that the public key belongs to the target instance and both this information and the public key itself have to be protected against manipulation in the source instance. In practice, however, these requirements are relatively easy to fulfil if the source instance is initially provided with cryptographic material. The later dynamic introduction of keys is made more difficult during the runtime, however. In particular, the introduction of public keys from other communication partners, which are integrated into the system as further target instances during the runtime of the system, is complex and difficult. However, this problem does not even arise if the public keys, to be used for encryption, of the target instance are introduced into the source instance in the form of certificates, since in this case the secure introduction and integrity-protected storage of the public (root) key of a certification authority is sufficient to be able to securely check the integrity of all subsequently introduced certificates at any time.

According to a very advantageous further development of the method according to the invention, it is therefore provided that a certification authority based on an asymmetrical key pair is set up within the system. The root certificate of this certification authority contains the public key of the certification authority, which can be used to check the validity of the leaf certificates containing the public keys used for the actual encryption and thus in particular the origin or affiliation of the individual encryption keys to the respective target instance. Because the leaf certificates issued by the certification authority contain encryption keys, these leaf certificates are also referred to hereinafter as encryption certificates. According to the advantageous further development of the method according to the invention, the certification authority is provided with a secure interface, which enables the issuing of leaf certificates for individual public keys belonging to the target instance, wherein the public keys contained in the leaf certificates are suitable for the asymmetrical encryption by means of an asymmetrical encryption method and the corresponding private keys are suitable for decryption by means of the asymmetrical encryption method. All of the leaf certificates issued by the certification authority for target instances are stored accordingly in the certification authority or in a third-party system connected to the certification authority. A retrieval interface is offered via which the source instances can retrieve or download leaf certificates issued for the target instances from the certification authority or the third-party system. Furthermore, a certificate containing the public key of the respective target instance is initially issued for all target instances of the system by the certification authority using the secure interface and/or the target instances are given the option of being issued such certificates by the certification authority using the secure interface. All source instances of the system are provided with the public key of the certification authority in a secure manner and store it as a trust anchor for the leaf certificates issued by the certification authority, which are encryption certificates in the sense described above. All source instances of the system are also given the option of dynamically retrieving the required or additionally required leaf certificates of the target instances from the certification authority or the third-party system which stores these leaf certificates.

The use of such a certification authority and of encryption certificates issued by it makes it possible to transmit encrypted data to newly added target instances or instances that were not yet known before the source system was commissioned, which is a considerable advantage in practical use, especially in a dynamically changing system such as a vehicle ecosystem.

The retrieval interface itself does not necessarily have to be designed as a secure interface, which makes it much easier to set up and use.

Further advantageous embodiments of the method according to the invention and its variants result from the exemplary embodiments which are described in more detail below with reference to the figures.

BRIEF DESCRIPTION OF THE DRAWING FIGURES

Here:

DETAILED DESCRIPTION

Figure 1:
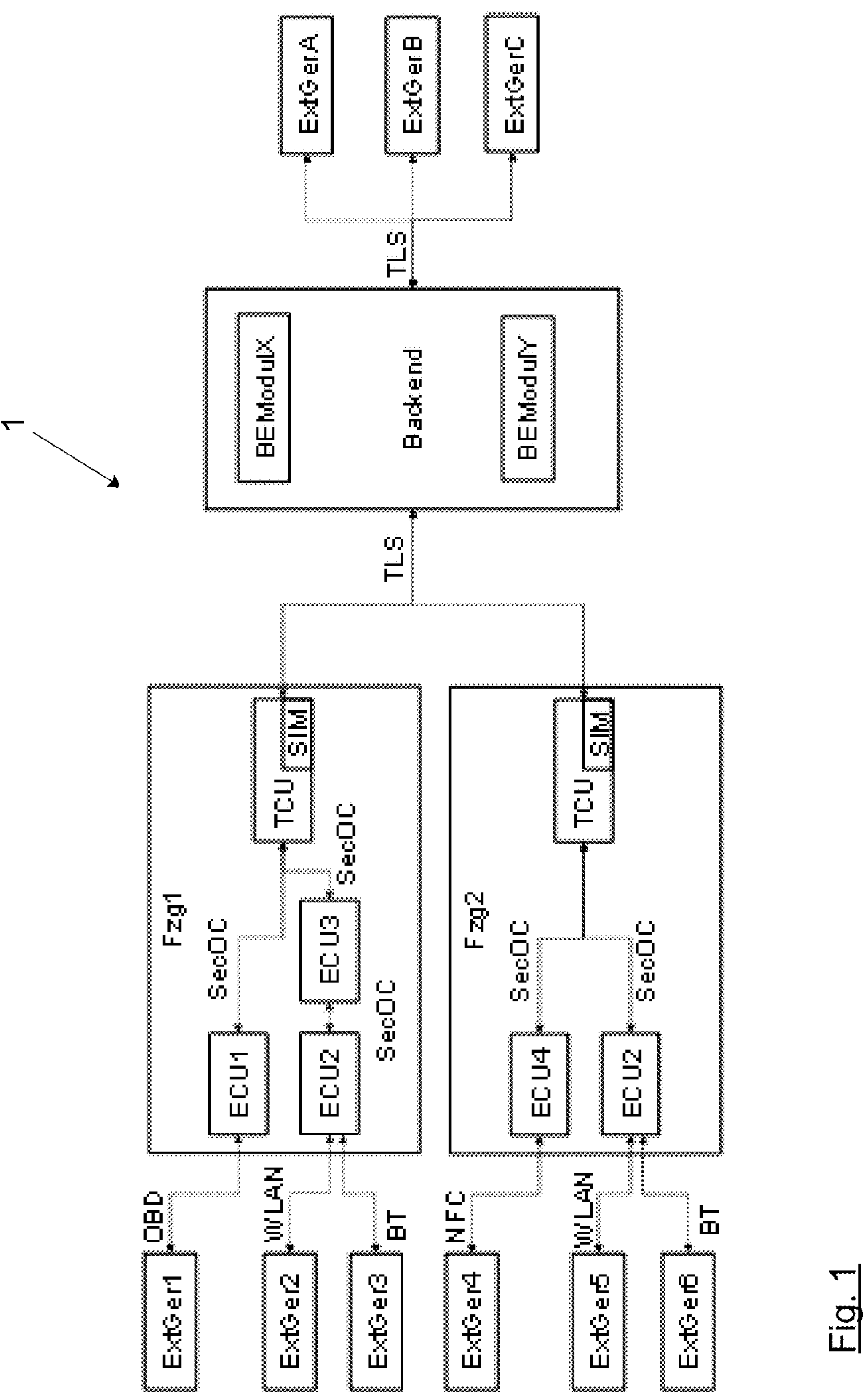
FIG. 1 shows a schematic representation of a vehicle ecosystem.

FIG. 1 shows a schematic exemplary vehicle ecosystem 1 having two vehicles Fzg1, Fzg2 and a backend consisting of two modules BEModulX and BEModulY. Each of the vehicles Fzg1, Fzg2 contains a telematics control unit (TCU), which in turn contains a SIM card SIM and can produce a direct internet connection secured with TLS to the backend. Certain control devices (ECUs) of the vehicles Fzg1, Fzg2 communicate with external devices ExtGer1-ExtGer6, e.g., smartphones, laptops, dongles, etc. via Near Field Communication NFC, Bluetooth BT, WLAN and/or the on-board diagnosis socket OBD, etc. On the other side, multiple external devices ExtGerA, ExtGerB, ExtGerC, e.g., smartphones, laptops, etc., are connected to the backend via a connection secured with TLS. All TCUs, ECUs, and the backend or its modules BEModulX and BEModulY, as well as the external devices ExtGer1-ExtGer6 and the external devices ExtGerA, ExtGerB, ExtGerC represent sub-systems or instances IZi of the vehicle ecosystem 1, wherein $1 \leq i \leq n$ and n is any natural number.

A method for authenticating data in such a vehicle ecosystem 1 having several instances IZi is described in the following section using the example of three participating sub-systems or instances IZ1, IZ2 and IZ3. However, it can of course also include further instances IZi.

For the example, in the vehicle ecosystem 1, three different instances IZ1, IZ2, IZ3 having the respective unique identity labels IZ1_ID, IZ2_ID, IZ3_ID therefore become active. Both between the first instance IZ1 and the second instance IZ2, as well as between the second instance IZ2 and the third instance IZ3, there is a relationship of trust in at least one direction. In each case, the second instance IZ2 is to trust the first instance IZ1 and the third instance IZ3 is to trust the second instance IZ2. The first and the second instance IZ1, IZ2 and the second and the third instance IZ2, IZ3 are thus neighboring instances in the sense of the description. The instances IZ1 and IZ2 have implemented an authentication mechanism AUTH12, which IZ1 can use to authenticate itself to IZ2. The instances IZ2 and IZ3 similarly have implemented a—possibly different—authentication mechanism AUTH23, which IZ2 can use to authenticate itself to IZ3.

Figure 2:
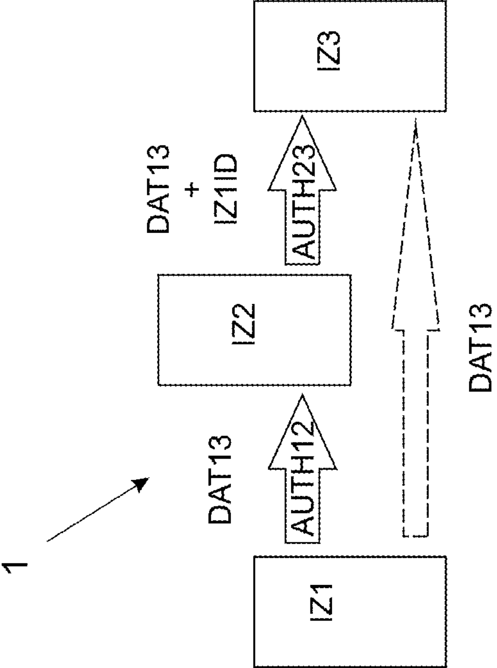
FIG. 2 shows a schematic representation of a first variant of the method according to the invention for delegating the authentication.

FIG. 2 shows, in a schematic representation, these three instances and the object on which the method is based. This consists in the authenticated transmission of data DAT13 from the first instance IZ1 as source instance IZ1 to the third instance IZ3 as target instance IZ2, as indicated by the dashed arrow. The source instance is, however, a control device (ECU) that does not have the ability to store a secret securely and that does not have the computational capacity for suitable authentication with respect to the target instance IZ3. The data DAT13 to be sent from the source instance IZ1 to the target instance IZ3 is therefore first transmitted by the source instance IZ1 to an intermediate instance IZ2, authenticated using the authentication mechanism AUTH12, which does not require a secret. The authenticity of the transmitted data is checked by the intermediate instance IZ2 using the authentication mechanism AUTH12. If this check has a positive result, a combination of the data DAT13 and an identity label IZ1_ID of the target instance is authenticated with the authentication mechanism AUTH23 and transmitted by the intermediate instance IZ2 to the target instance IZ3. There, the authenticity of the combination consisting of the data DAT13 and the identity label IZ1_ID is then checked by the target instance IZ3 using the authentication mechanism AUTH23. If this check has a positive result, the target instance IZ3 can then trust that the data DAT13 has been received authentically from the source instance IZ1 and can handle or use it accordingly.

In general, the authentication mechanisms AUTH12 and AUTH23 are different mechanisms and the target instance IZ3 cannot check the authenticity of the data authenticated by the source instance IZ1 using the authentication mechanism AUTH12, e.g., because the target instance IZ3 has not implemented the mechanism AUTH12 and/or because the target instance IZ3 lacks the cryptographic material necessary to check the authenticity of the data authenticated by the source instance IZ1 using the authentication mechanism AUTH12 and/or because one of the prerequisites of the authentication mechanism AUTH12, e.g., the local proximity between the participating instances or the communication of the participating instances via a specific bus, is not given for the source instance IZ1 and the target instance IZ3. If, for example, the source instance IZ1 is not a control device but a smartphone that authenticates itself to an intermediate instance IZ2, which is, for example, a control device installed in the vehicle, using Bluetooth mechanisms, and this control device, as an intermediate instance IZ2, has in turn implemented an endorsement authentication mechanism, i.e., the intermediate instance IZ2 is in possession of a private endorsement key and an associated certificate with which it can authenticate itself to the target instance IZ3, which is, for example, a backend module, then the backend module, as a target instance IZ3, cannot check the Bluetooth authentication AUTH12 of the source instance. For this reason, the target instance IZ3 can only assume that the data DAT13 actually originates from the source instance IZ1 if it trusts the intermediate instance IZ2 to have ensured that the data DAT13 originates from the source instance IZ1 and if the target instance IZ3 assumes that the authentication mechanism AUTH23 is secure.

Under the special assumption that both the authentication mechanism AUTH12 and the authentication mechanism AUTH23 are based on authentication stamps, e.g., digital signatures or MACs, i.e., they generate authentication stamps and check them, where AUTH12_GEN or AUTH23_GEN denotes the function belonging to AUTH12 or respectively AUTH23 for generating an authentication stamp, AUTH12_VER or AUTH23_VER denotes the function belonging to AUTH12 or respectively AUTH23 for checking (verifying) an authentication stamp and both AUTH12 and AUTH23 already implicitly contain the required cryptographic material, i.e. the required cryptographic material is not explicitly identified as a parameter, the proposed method consists of the following steps:

- In the source instance IZ1:
  - the authentication stamp AuthSt12 of data DAT13 is calculated with AUTH12_GEN, i.e. AuthSt12: =AUTH12_GEN (DAT13);
  - the message (DAT13, AuthSt12) is transmitted to the intermediate instance IZ2.
- In the authenticated intermediate instance IZ2 after receipt of (DAT13, AuthSt12)):
  - validity of the received authentication stamp AuthSt12 of the received data DAT13 is checked with AUTH12_VER, the Boolean value AUTH12_VER (DAT13, AuthSt12) is therefore calculated;
  - If the check is positive, the authentication stamp AuthSt23 of the combination of data DAT13 and the identity label IZ1_ID of IZ1, i.e. of (DAT13, IZ1_ID) is calculated with AUTH23_GEN, i.e., AuthSt23:=AUTH23_GEN((DAT13, IZ1_ID)), otherwise special treatment will be initiated;
  - the message (DAT13, IZ1_ID, AuthSt23) is transmitted to the intermediate instance IZ3.
- In the target instance IZ3 after receipt of (DAT13, IZ1_ID, AuthSt23):
  - validity of the received authentication stamp AuthSt23 of the received data (DAT13, IZ1_ID) is checked with AUTH23_VER, the Boolean value AUTH23_VER((DAT13, IZ1_ID), AuthSt23) is therefore calculated;
  - If the check is positive, it is assumed that the data DAT13 originates from IZ1 and the data DAT13 is used accordingly, otherwise special treatment is initiated.

Figure 3:
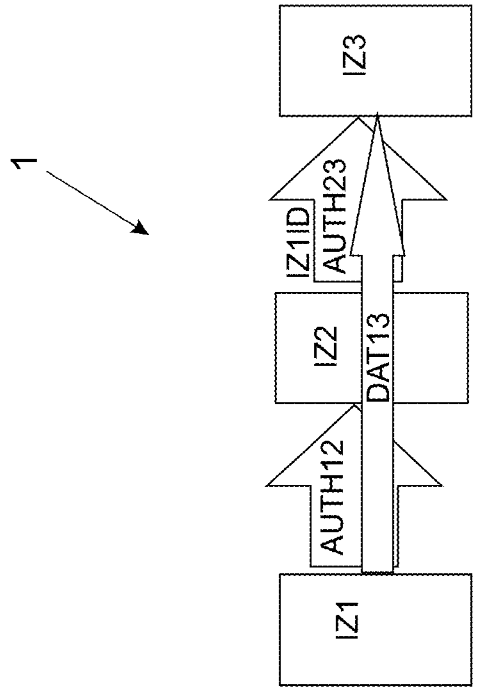
FIG. 3 shows a schematic representation of a further variant of the method according to the invention for delegating the authentication.
Figure 3:

The presented method does not protect the data DAT13 sent by the source instance IZ1 against being read by the intermediate instance IZ2, which confirms the authenticity of this data DAT13 with respect to the target instance IZ3. It is known from the general prior art how to secure data exchanged between the two instances of a vehicle ecosystem 1 for example via end-to-end encryption based on asymmetrical encryption. For example, the target instance IZ1 can encrypt the data DAT13 before its transmission to the intermediate instance IZ2, in order to prevent it from being read by the intermediate instance IZ2. In the combination with the above-described delegation of the authentication of the data DAT13 from the source instance IZ1 to the intermediate instance IZ2 to the target instance IZ3, the process shown schematically in FIG. 3 is created.

As a special version of the method, the target instance IZ3 can be provided with an asymmetrical decryption method AsymmDECR and a matching asymmetrical key pair (IZ3Pub, IZ3Priv). The private key IZ3Priv is securely stored in the target instance IZ3, the source instance IZ1 is provided with the asymmetrical encryption method AsymmENCR corresponding to the decryption method AsymmDECR and the public key IZ3Pub of the target instance IZ3, and the data DAT13Plain to be transmitted from the source instance IZ1 to the target instance IZ3 is encrypted directly with the public key IZ3Pub using the encryption method AsymmENCR before being transmitted to the target instance IZ3. Alternatively, the source instance IZ1 could also be provided with a symmetrical encryption method SymmENCR and the target instance IZ3 with the symmetrical decryption method SymmDECR corresponding to the encryption method SymmENCR. The data DAT13Plain to be transmitted from the source instance IZ1 to the target instance IZ3 could then be encrypted with a newly generated secure, e.g. random, symmetrical key matching the SymmENCR/SymmDECR encryption and decryption methods, a so-called transport key, before being sent to the intermediate instance IZ2. It is then sufficient to encrypt this newly generated transport key with the asymmetrical public key IZ3Pub and to transmit the thus encrypted transport key to the intermediate instance IZ2 as part of the data DAT13 to be authenticated.

Under the assumption already made above that both AUTH12 and AUTH23 are based on authentication stamps, e.g., digital signatures or MACs, i.e., generate authentication stamps and check them, AUTH12_GEN or AUTH23_GEN denotes the function for generating authentication stamps belonging to AUTH12 or respectively AUTH23, AUTH12_VER or AUTH23_VER denotes the function for checking (verifying) authentication stamps belonging to AUTH12 or respectively AUTH23, and both AUTH12 and AUTH23 already implicitly contain the required cryptographic material, i.e., the required cryptographic material is not explicitly identified as a parameter, the second variant of the proposed method, i.e. the variant with the use of a symmetrical transport key, consists of the following steps:

In the source instance IZ1:
- a new symmetrical transport key transpKey is created with the aid of a secure method;
- the data DAT13Plain to be sent is encrypted with SymmENCR using transpKey, i.e., DAT13ENCR:=SymmENCR(transpKey, DAT13Plain);
- the transport key transpKey is encrypted asymmetrically with AsymmENCR using IZ3Pub, i.e., transpKeyENCR:=AsymmENCR(IZ3Pub, transpKey);
- the data DAT13 to be transmitted, determined for IZ3, is formed as the combination of DAT13ENCR and transpkeyENCR, i.e. DAT13:=(DAT13ENCR, transpKeyENCR);
- the authentication stamp AuthSt12 of the data DAT13 to be transmitted is calculated with AUTH12_GEN, i.e., AuthSt12:=AUTH12_GEN (DAT13);
- the message (DAT13, AuthSt12) is transmitted to IZ2.

In the authenticated intermediate instance IZ2, after receipt of (DAT13, AuthSt12)):
- validity of the received authentication stamp AuthSt12 of the received data DAT13 is checked with AUTH12_GEN, the Boolean value AUTH12_VER (DAT13, AuthSt12) is therefore calculated;
- if the check is positive, the authentication stamp AuthSt23 of the combination of data DAT13 and the identity label IZ1_ID of IZ1, i.e. of (DAT13, IZ1_ID) is calculated with AUTH23_GEN, i.e., AuthSt23:=AUTH23_GEN((DAT13, IZ1_ID)), otherwise special treatment is initiated;
- the message (DAT13, IZ1_ID, AuthSt23) is transmitted to IZ3.

In the target instance IZ3, after receipt of (DAT13, IZ1_ID, AuthSt23):
- validity of the received authentication stamp AuthSt23 of the received data (DAT13, IZ1_ID) is checked with AUTH23_VER, the Boolean value AUTH23_VER((DAT13, IZ1_ID), AuthSt23) is therefore calculated;
- if the check is positive, the two components DAT13ENCR and transpKeyENCR are extracted from DAT13, otherwise special treatment is initiated;
- transpKeyENCR is decrypted with the aid of the private key IZ3Priv and therefore the transport key transpKey is determined, i.e., transpKey:=AsymmDECR(IZ3Priv, transpKeyENCR);
- DAT13 is decrypted with the aid of the transport key transpKey and therefore the useful data DAT13Plain is determined, i.e., DAT13:=SymmDECR (transpKey, DAT13ENCR);
- it is assumed that the data DAT13Plain originates from IZ1 and the data DAT13Plain is used accordingly.

In the described variant of the method provided with encryption, the source instance IZ1 is provided with the public key IZ3Pub of the target instance IZ3. If this public key IZ3Pub is stored as a pure key and not as a certificate, this key must be introduced in a secure manner, in particular it must be ensured that the source instance IZ1 knows that the key IZ3Pub belongs to the target instance IZ3 and both this information and the key IZ3Pub itself must be protected against manipulation in the source instance IZ1. These requirements can be met relatively well when the source instance IZ1 is initially provided with cryptographic material, but they make the dynamic introduction of such keys, in particular the introduction of public keys belonging to other communication partners, significantly more difficult during runtime.

It may therefore be useful to set up an encryption certification authority ENCR-CA for leaf certificates containing asymmetrical public encryption keys within the vehicle ecosystem 1. The root certificate EncrRootCert of this certification authority ENCR-CA contains the public key EncrRootPub of the certification authority ENCR-CA, which can be used to check the validity of the leaf certificates EncrIndCert containing the actual encryption keys EncrIndPub and thus in particular the origin or affiliation of the encryption keys EncrIndPub to the respective target instances. Because the leaf certificates issued by the certification authority ENCR-CA contain encryption keys, these leaf certificates are also referred to below as encryption certificates.

Figure 4:
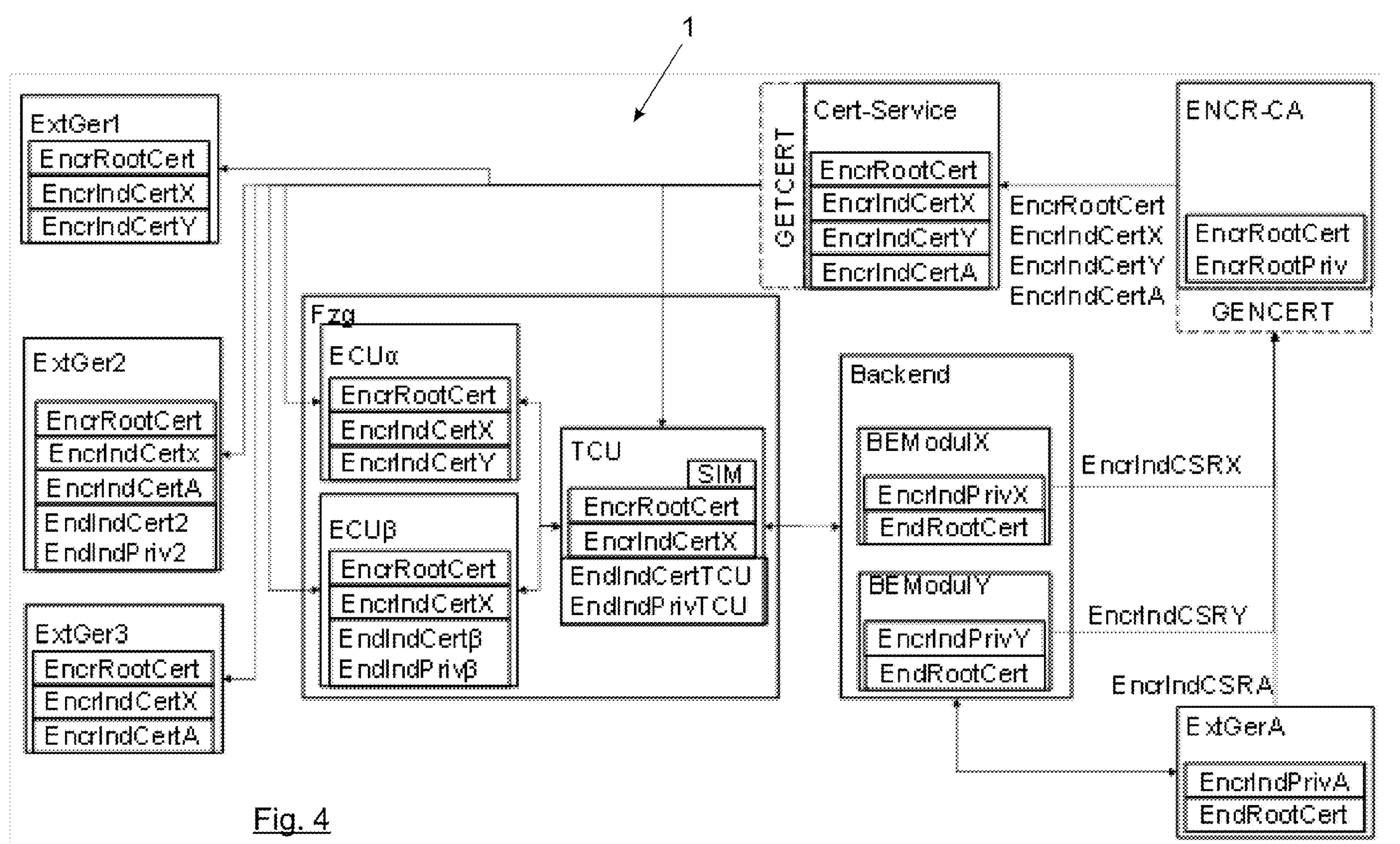
FIG. 4 shows a schematic representation of the provisioning of the instances of a vehicle ecosystem having encryption certificates.

FIG. 4 shows the provisioning of the instances IZi of an exemplary vehicle ecosystem 1, which is provided with a certification authority ENCR-CA and a certification service Cert-Service, which is implemented by a third-party system and is used to distribute the leaf certificates issued by the certification authority ENCR-CA. It is assumed that the same certification authority ENCR-CA is used for all target instances IZ3 (BEModulX, BEModulY, ExtGerA). FIG. 4 also shows the status of the individual instances IZi after they have been provided with endorsement cryptographic material, i.e., with individual private endorsement keys, individual endorsement certificates, root endorsement certificates, etc. It is assumed that the individual endorsement certificates for all authenticating instances IZ2 (ExtGer2, ExtGerß, TCU) are issued by the same endorsement certification authority END-CA, i.e. are signed with the same private root key EndRootPriv.

In order to equip all instances IZ1, IZ2, IZ3 with the required certificates, the system structure is designed in such a way that an encryption certification authority ENCR-CA based on an asymmetrical key pair (EncrRootPub, EncrRootPriv) is set up within the vehicle ecosystem. The encryption certification authority ENCR-CA is provided with a secure interface GENCERT, which enables the issuance of leaf certificates EncrIndCertIZ3 for individual public keys EncrIndPubIZ3 belonging to target instances IZ3, wherein the public keys EncrIndPubIZ3 contained in the leaf certificates are suitable for asymmetrical encryption by means of the asymmetrical encryption method AsymmENCR and the corresponding private keys EncrIndPrivIZ3 are suitable for decryption by means of the asymmetrical decryption method AsymmDECR.

All leaf certificates issued by the encryption certification authority ENCR-CA for target instances IZ3 are filed or stored in the encryption certification authority ENCR-CA or in a third-party system connected to the encryption certification authority ENCR-CA. A (not necessarily secure) retrieval interface GETCERT is set up via which source instances IZ1 can download or retrieve leaf certificates issued for the target instances IZ3 directly from the encryption certification authority ENCR-CA or from the third-party system storing the leaf certificates. As already indicated above, the retrieval interface GETCERT does not need to be secured, as the leaf certificates are protected against manipulation by a signature with EncrRootPriv and the information contained in the certificates is generally not confidential, i.e., public.

Furthermore, it is intended to provide all target instances IZ3 of the vehicle ecosystem 1 with an individual asymmetrical key pair suitable for encryption or decryption (EncrIndPubIZ3, EncrIndPrivIZ3) and to store the private key EncrIndPrivIZ3 in the target instances IZ3, protected against unauthorized reading. For this purpose, an individual certificate (signed with EncrRootPriv) containing the individual public key EncrIndPubIZ3 is initially issued for all target instances IZ3 of the vehicle ecosystem 1 by the encryption certification authority ENCR-CA using the secure interface GENCERT and/or the target instances IZ3 are given the option of having such certificates issued at runtime by the encryption certification authority ENCR-CA using GENCERT.

All source instances IZ1 of the vehicle ecosystem 1 are now provided (initially or at runtime) in a secure manner with the public key EncrRootPub of the encryption certification authority ENCR-CA and store it in the respective source instance IZ1 in a tamper-proof manner as a trust anchor for the leaf certificates (encryption certificates) issued by the encryption certification authority ENCR-CA. Furthermore, it is intended to provide all source instances IZ1 of the vehicle ecosystem 1 with the option of dynamically, i.e., at runtime, retrieving or receiving the required or additionally required leaf certificates of the target instances IZ3 from the encryption certification authority ENCR-CA or the third-party system which stores these leaf certificates.

In operation, the process is then such that each target instance IZ3 that wants to receive and decrypt data encrypted by source instances IZ1 and whose encryption certificate EncrIndCertIZ3 is not yet available in the encryption certification authority ENCR-CA or in the third-party system that stores the encryption certificates, initiates the generation of an encryption certificate EncrIndCertIZ3 by the encryption certification authority ENCR-CA and its storage in the encryption certification authority ENCR-CA or the third-party system via the secure interface GENCERT.

Each source instance IZ1 that wants to send encrypted data DAT13Plain to a target instance IZ3 performs the following steps:

- If the encryption certificate of the target instance IZ3 is not yet available in the source instance IZ1 or if this encryption certificate is to be renewed, the source instance IZ1 downloads the current encryption certificate EncrIndCertIZ3 from the encryption certification authority ENCR-CA or the third-party system using the retrieval interface GETCERT.
- The source instance IZ1 checks the validity of the downloaded encryption certificate EncrIndCertIZ3 using the public key EncrRootPub, stored in the source instance IZ1 in a tamper-protected manner, of the encryption certification authority ENCR-CA, wherein the key EncrRootPub (as shown in FIG. 4) can also be part of the root certificate EncrRootCert.
- If the check of the encryption certificate EncrIndCertIZ3 is positive, the public key EncrIndPubIZ3, contained in the encryption certificate EncrIndCertIZ3, of the target instance IZ3 is extracted and encryption is continued in accordance with the method described above by using the key EncrIndPubIZ3 extracted from the encryption certificate EncrIndCertIZ3 as the asymmetrical key IZ3Pub. If the check is negative, special treatment is initiated.

It should be noted that the third-party system storing the encryption certificates EncrIndCertIZ3 may be present several times in the vehicle ecosystem 1 in order to make it as convenient as possible for the source instances IZ1 to retrieve encryption certificates EncrIndCertIZ3. In particular, a third-party location containing all or some of the available encryption certificates EncrIndCertIZ3 can be set up in a vehicle control device, for example, and thus enable the control devices installed in the same vehicle to retrieve encryption certificates EncrIndCertIZ3 particularly easily.

The above description of the method assumes that the encryption certification authority ENCR-CA only supports root and leaf certificates, i.e., no intermediate certificates. However, the method can be extended in an obvious way to certificate chains that go back to the encryption certification authority ENCR-CA. In this case, when generating encryption certificates EncrIndCertIZ3 using the secure interface GENCERT, intermediate certificates may still have to be generated, and when retrieving encryption certificates EncrIndCertIZ3 using the retrieval interface GETCERT, instead of the one encryption certificate EncrIndCertIZ3, a certificate chain containing the encryption certificate EncrIndCertIZ3 may be returned, which is then completely checked by the target instance IZ1 using the public root key EncrRootPub of the encryption certification authority ENCR-CA stored there.

The retrieval interface GETCERT, which can be used to retrieve encryption certificates EncrIndCertIZ3, can be implemented in a variety of ways. In particular, it can implement a JSON Web Key (JWK) returning service, as described in RFC7517, which can also return certificate chains of any length.

The considerations made for the encryption certification authority ENCR-CA can also be transferred to an endorsement certification authority END-CA, which facilitates the use of the endorsement certificates mentioned above.

An endorsement certification authority END-CA is set up for this purpose. The endorsement-authentication-capable instances or intermediate instances IZ2 (e.g., ExtGer2, ECUß, TCU) are then provided with an individual asymmetrical private endorsement key EndIndPrivIZ2 and a corresponding individual endorsement certificate EndIndCertIZ2 issued by the endorsement certification authority END-CA (as shown in FIG. 4) or with a certificate chain issued by the endorsement certification authority END-CA, whose leaf certificate corresponds to EndIndPrivIZ2 (not shown in the figure).

The encryption certification authority ENCR-CA is set up by generating an asymmetrical key pair (EncrRootPub, EncrRootPriv) and, if necessary (as shown in FIG. 4), generating a self-signed root certificate EncrRootCert containing the public key EncrRootPub. The public root key EndRootPub of the endorsement certification authority END-CA is distributed (e.g., initially e.g., as a raw public key or as a self-signed root certificate EndRootCert containing this key (as shown in the figure)) to all target instances IZ3 (e.g. BEModulX, BEModulY, ExtGerA), which are to be able to check signatures generated with the help of private endorsement keys and are stored there as a tamper-proof trust anchor.

The public root key EncrRootPub of the encryption certification authority ENCR-CA is distributed (e.g. initially e.g. as a raw public key or as a self-signed root certificate EncrRootCert containing this key (as shown in the figure)) to all source instances IZ1 (ExtGer1, ExtGer2, ExtGer3, ECUα, ECUβ, TCU), which want to send encrypted data to one of the target instances IZ3 with the help of public keys contained in encryption certificates.

The individual private endorsement keys EndIndPrivIZ2 and the corresponding endorsement certificates EndIndCertIZ2 are generated in a known manner and introduced into the intermediate instances IZ2. The encryption certificates can be generated, for example, by (as shown in the figure) each of the target instances IZ3 generating an individual key pair (EncrIndPubIZ3, EncrIndPrivIZ3) and then sending a Certificate Signing Request (CSR) EncrIndCSRIZ3 containing the public key EncrIndPubIZ3 to the encryption certification authority ENCR-CA in an authenticated manner, which is not shown in the figure, using the interface GENCERT, whereupon the encryption certification authority ENCR-CA generates an individual encryption certificate EncrIndCertIZ3 from the Certificate Signing Request CSR or alternatively (not shown in the figure) another trustworthy system, which may or may not be the encryption certification authority ENCR-CA, generates the individual key pair (EncrIndPubIZ3, EncrIndPrivIZ3), introduces the private key EncrIndPrivIZ3 into the target instance IZ3 in a secure manner and sends a certificate signing request EncrIndCSRIZ3 containing the public key EncrIndPubIZ3 to the encryption certification authority ENCR-CA in an authenticated manner, whereupon the latter generates an individual encryption certificate EncrIndCertIZ3 from the CSR. The encryption certificates generated by the encryption certification authority ENCR-CA are transmitted to the encryption certificate distribution service Cert-Service and stored there. The source instances IZ1 can thus retrieve or download the encryption certificates they require from the encryption certificate distribution service Cert-Service using the retrieval interface GETCERT.

The above considerations regarding the certificate chains also apply analogously to the considerations relating to the endorsement certification authority, which can also be easily adapted to certificate chains.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for authenticating data transmitted in a system between a source instance and a non-neighboring target instance that does not trust the source instance, wherein the system has at least three instances, the data is transmitted between two of the at least three instances, the at least three instances include a first instance, a second instance, and a third instance, and each of the at least three instances has a unique identity label, the method comprising:

authenticating, by the first instance as the source instance using an authentication mechanism common with intermediate instance that trusts the first instance, the data to be transmitted by the first instance to the non-neighboring target instance that trusts the intermediate instance and does not trust the first instance;

transmitting, by the first instance to the intermediate instance, the data authenticated by the first instance;

checking, by the intermediate instance, the authentication of the data performed by the first instance;

providing, by the intermediate instance responsive to the checking indicating that the data is authenticated, the data with an identity label of the first instance;

reauthenticating, by the intermediate instance using an authentication mechanism common with a neighboring instance that trusts the intermediate instance, the authenticated data having the identity label of the first instance;

transmitting, by the intermediate instance to the neighboring instance, the reauthenticated data having the identity label of the first instance;

checking, by the neighboring instance, the reauthentication of the data having the identity label of the first instance performed by the intermediate instance;

reauthenticating, by the neighboring instance using an authentication mechanism common with a further neighboring instance that trusts the neighboring instance and responsive to the checking by the neighboring instance indicating that the data having the identity label of the first instance is reauthenticated, the reauthenticated data having the identity label of the first instance;

transmitting, by the neighboring instance to the further neighboring instance, the data with the identity label of the first instance that was reauthenticated by the neighboring instance; and repeating the checking of the authentication of the data by the intermediate instance and the neighboring instance, the reauthenticating the data by the intermediate instance and the neighboring instance, and the transmitting the data by the intermediate instance and the neighboring instance until the data reaches the non-neighboring target instance from the source instance, wherein the authentication mechanism common with intermediate instance, the authentication mechanism common with the neighboring instance, and the authentication mechanism common with the further neighboring instance are different authentication mechanisms, each selected from the following authentication mechanisms:

authentication based on digital signatures;

authentication based on symmetrical methods;

authentication based on Bluetooth;

authentication based on Wireless Local Area Network (WLAN);

authentication based on Near Field Communication (NFC);

authentication based on Secure Onboard Communication (SecOC);

authentication based on Transport Layer Security (TLS);

authentication based on biometric methods; and authentication based on a technology established local proximity.

2. The method of claim 1, wherein one of the three instances is the source instance, another one of the three instances is the target instance, and further one of the three instances is the intermediate instance.

3. The method of claim 1, wherein at least one of the at least three instances comprises at least one sub-instance with a unique identity label, wherein the at least one of the at least three instances trusts the at least one sub-instance, and wherein the at least one sub-instance has implemented an authentication mechanism for authenticating itself to the at least one of the at least three instances.

4. The method of claim 1, wherein the authentication mechanism common with intermediate instance, the authentication mechanism common with the neighboring instance, or the authentication mechanism common with the further neighboring instance further comprises authentication based on use of a communication channel validated as secure and trustworthy.

5. The method of claim 1, wherein the authentication mechanism common with the neighboring instance or the authentication mechanism common with the further neighboring instance is an authentication using a private endorsement key of an instance sending the data and its endorsement certificate.

6. The method of claim 1, wherein the data to be transmitted is encrypted by the source instance using an encryption that only requires decryption by the target instance.

7. The method of claim 6, wherein the target instance is provided with an asymmetrical decryption method and a matching asymmetrical key pair, wherein a private key of the asymmetrical key pair is stored securely in the target instance, wherein the source instance is provided with a corresponding asymmetrical encryption method and a public key of the asymmetrical key pair, so that the source instance can encrypt the data to be transmitted.

8. The method of claim 7, wherein the source instance is also provided with a symmetrical encryption method and the target instance is provided with a corresponding symmetrical decryption method, wherein, before the data is sent by the source instance, the data to be transmitted is encrypted with a newly created secure or random transport key, wherein a transport key is encrypted with the public key of the asymmetrical key pair and is transmitted together with the encrypted data to be transmitted.

9. The method of claim 7, wherein a certification authority based on an asymmetrical root key pair is set up within the system, the certification authority is provided with a secure interface enabling issuing of leaf certificates for individual public keys belonging to the target instance, public keys contained in the leaf certificates are suitable for asymmetrical encryption using the asymmetrical encryption method and corresponding private keys are suitable for decryption by the asymmetrical decryption method, all of the leaf certificates issued by the certification authority for target instances are stored in the certification authority or in a third-party system connected to the certification authority, a retrieval interface is offered via which source instances can download leaf certificates issued for the target instances from the certification authority or the third-party system, an individual certificate containing a public key of respective target instance is initially issued for all the target instances of the system by the certification authority using the secure interface or the target instances are given an option of being issued such certificates by the certification authority using the secure interface, all source instances of the system are provided with a public key of the certification authority in a secure manner and store the public key of the certification authority in a tamper-proof manner as a trust anchor for the leaf certificates issued by the certification authority, and all source instances of the system are given an option of dynamically retrieving required or additionally required leaf certificates of the target instances from the certification authority or the third-party system storing these leaf certificates.

10. The method of claim 9, wherein the retrieval interface is an unsecure interface.

11. The method of claim 1, wherein the system is a vehicle ecosystem, comprising at least one of the following instances:

a vehicle-external backend server or at least one of module of the vehicle-external backend server;

individual control devices installed in vehicles;

smartphones running vehicle-related applications, the smartphones communicate with individual control devices installed in a vehicle or with the vehicle-external backend server; and manufacturer-specific or vehicle-specific external devices or interfaces for the manufacturer-specific or the vehicle-specific external devices configured to communicate directly with control devices installed in a vehicle.

* * * * *